United States Patent
Rakshit et al.

(10) Patent No.: US 12,411,476 B2
(45) Date of Patent: Sep. 9, 2025

(54) MAXIMIZING SOLAR PANEL POWER GENERATION WITH SHADOW ENERGY GENERATION

(71) Applicant: INTERNATIONAL BUSINESS MACHINES CORPORATION, Armonk, NY (US)

(72) Inventors: Sarbajit K. Rakshit, Kolkata (IN); Manikandan Padmanaban, Chennai (IN); Jagabondhu Hazra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 18/064,570

(22) Filed: Dec. 12, 2022

(65) Prior Publication Data

US 2024/0192660 A1    Jun. 13, 2024

(51) Int. Cl.
*G05B 19/4155* (2006.01)
(52) U.S. Cl.
CPC .............. *G05B 19/4155* (2013.01); *G05B 2219/37283* (2013.01)
(58) Field of Classification Search
None
See application file for complete search history.

(56) References Cited

U.S. PATENT DOCUMENTS

| | | | |
|---|---|---|---|
| 10,418,932 B2 | 9/2019 | Carabateas | |
| 10,989,839 B1* | 4/2021 | Matthews | G01W 1/10 |
| 2010/0204844 A1* | 8/2010 | Rettger | H02J 3/381 |
| | | | 700/297 |
| 2019/0158011 A1* | 5/2019 | West | G06N 20/20 |
| 2019/0163160 A1* | 5/2019 | Dayama | G02B 26/0825 |
| 2020/0098170 A1* | 3/2020 | Sehgal | H02J 3/004 |
| 2020/0395886 A1 | 12/2020 | Cramer | |

FOREIGN PATENT DOCUMENTS

WO    2015029746 A1    3/2015

OTHER PUBLICATIONS

Zhang et al, "Energy harvesting from shadow-effect", Aug. 2020, Energy & Environmental Science, pp. 2404-2412 (Year: 2020).*

(Continued)

*Primary Examiner* — David Earl Ogg
(74) *Attorney, Agent, or Firm* — Edward J. Wixted, III (57) ABSTRACT

An approach for adjusting an inclination angle of a mirror to maximize power output of an adjacent solar panel and shadow-effect energy generator (SEG). The approach retrieves data associated with a solar irradiance profile and a SEG shadow profile. The approach predicts an irradiance profile based on the data. The approach predicts a shadow contrast ratio based on the data. The approach predicts a SEG shadow profile based on the data. The approach calculates optimized control parameters associated with a mirror based on the irradiance profile, the shadow contrast ratio and the SEG shadow profile. The approach adjusts the mirror inclination angle based on the optimized control parameters.

20 Claims, 6 Drawing Sheets

(56) References Cited

OTHER PUBLICATIONS

"Method and System for Dynamic Shape Change of a Robot to Harvest Power from a Shadow", an IP.com Prior Art Database Technical Disclosure, Authors et. al.: Disclosed Anonymously, IP.com No. IPCOM000267538D, IP.com Electronic Publication Date: Nov. 2, 2021, 4 pages.

Chadwick, Jonathan, "Scientists create 'reverse solar panel' that can generate electricity from Shadows", Daily Mail, Updated Jun. 10, 2020, 34 pages, <https://www.dailymail.co.uk/sciencetech/article-8345395/A-new-reverse-solar-panel-generates-electricity-shadows.html>.

Linder, Courtney, "Whoa: This Generator Turns Shadows Into Electricity", Popular Mechanics, Jun. 5, 2020, 7 pages, <https://www.popularmechanics.com/science/energy/a32780573/shadow-electricity-generator-solar-power/>.

Wilke, Carolyn, "A contrast between shadows and light can now generate electricity", ScienceNewsExplores, Jul. 9, 2020, 3 pages, <https://www.snexplores.org/article/device-generates-electricity-using-shadows>.

Zhang et al., "Energy harvesting from shadow-effect", Energy & Environmental Science, Accepted Apr. 15, 2020, DOI: 10.1039/d0ee00825g, 11 pages.

Zhang et al., "Shadow enhanced self-charging power system for wave and solar energy harvesting from the ocean", Nature Communications, 2021, 11 pages.

* cited by examiner

MAXIMIZING SOLAR PANEL POWER GENERATION WITH SHADOW ENERGY GENERATION

BACKGROUND

The present disclosure relates generally to the field of solar panel power generation, and more particularly to maximizing power generation based on shadow energy generation.

Maximizing total energy output, often results in solar panels oriented in their mounts to face south (in the Northern Hemisphere) or north (in the Southern Hemisphere) and tilted to allow for the latitude. Solar energy is the most abundant form of energy found on Earth. However, solar panels manufactured today to power residential homes, are generally between 15% and 18% efficient and with added mirror reflectors, overall efficiency increases by approximately 15% to 20%.

Solar mirror solar reflection increases power generation, adding mirror reflectors to solar panels can decrease ground coverage ratio (GCR), i.e., increase the ground footprint, to avoid shadowing an adjacent solar panel behind the mirror reflector. Accordingly, a need has arisen for improving the efficiency of a mirror reflected solar panel installation while utilizing the greater footprint incurred with the use of the mirror reflectors.

BRIEF SUMMARY

According to an embodiment of the present invention, a computer-implemented method for adjusting an inclination angle of a mirror to maximize power output of an adjacent solar panel and shadow-effect energy generator (SEG), the computer-implemented method comprising: retrieving, by one or more processors, data associated with a solar irradiance profile and a SEG shadow profile; predicting, by the one or more processors, an irradiance profile based on the data; predicting, by the one or more processors, a shadow contrast ratio based on the data; predicting, by the one or more processors, a SEG shadow profile based on the data; calculating, the one or more processors, optimized control parameters associated with a mirror based on the irradiance profile, the shadow contrast ratio and the SEG shadow profile; and adjusting, by the one or more processors, the mirror inclination angle based on the optimized control parameters.

According to an embodiment of the present invention, a computer system for adjusting an inclination angle of a mirror to maximize power output of an adjacent solar panel and shadow-effect energy generator (SEG), the computer system comprising: one or more solar panels; a mounting system for the one or more solar panels; one or more mirrors positioned adjacent to the one or more solar panels; one or more inclinometers and actuators for changing an inclination angle of the one or more mirrors; one or more shadow-effect energy generators positioned adjacent to the one or more solar panels; one or more computer processors and memory for executing program instructions; one or more non-transitory computer readable storage media; and program instructions stored on the one or more non-transitory computer readable storage media, the program instructions comprising: program instructions to retrieve data associated with a solar irradiance profile and a SEG shadow profile; program instructions to predict an irradiance profile based on the data; program instructions to predict a shadow contrast ratio based on the data; program instructions to predict a SEG shadow profile based on the data; program instructions to calculate optimized control parameters associated with a mirror based on the irradiance profile, the shadow contrast ratio and the SEG shadow profile; and program instructions to adjust the mirror inclination angle based on the optimized control parameters.

According to an embodiment of the present invention, a computer program product for adjusting an inclination angle of a mirror to maximize power output of an adjacent solar panel and shadow-effect energy generator (SEG), the computer program product comprising: one or more non-transitory computer readable storage media and program instructions stored on the one or more non-transitory computer readable storage media, the program instructions comprising: program instructions to retrieve data associated with a solar irradiance profile and a SEG shadow profile; program instructions to predict an irradiance profile based on the data; program instructions to predict a shadow contrast ratio based on the data; program instructions to predict a SEG shadow profile based on the data; program instructions to calculate optimized control parameters associated with a mirror based on the irradiance profile, the shadow contrast ratio and the SEG shadow profile; and program instructions to adjust the mirror inclination angle based on the optimized control parameters.

Other aspects and embodiments of the present invention will become apparent from the following detailed description, which, when taken in conjunction with the drawings, illustrate by way of example the principles of the invention.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
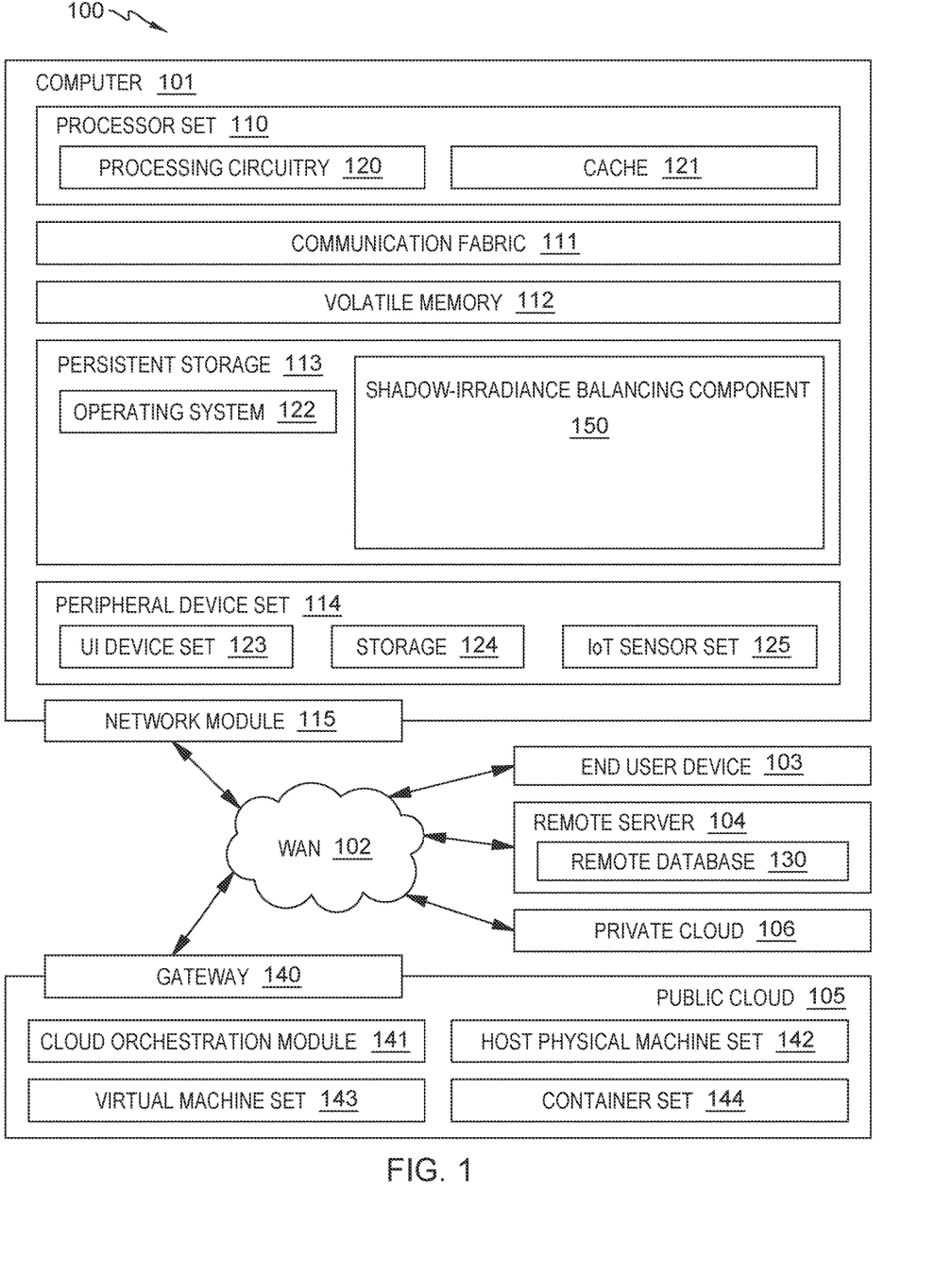
FIG. 1 depicts a cloud computing environment and a high-level architecture, in accordance with at least one embodiment of the present invention.

Computing environment 100 contains an example of an environment for the execution of at least some of the computer code involved in performing the inventive methods, such as shadow-irradiance balancing component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments described herein provide the capability to combine solar panels, reflective mirrors and shadow-effect energy generators (SEG) to maximize the energy utilization by controlling and maintaining an optimal bright and dark light contrast ratio for maximum utilization by controlling the mirror angle based on a forecast of irradiance, characteristic profile of an SEG, mirror profile, solar panel profile and controller electrical/mechanical constraints.

It should be noted that references throughout this specification to features, advantages, or similar language herein do not imply that all the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description, and appended claims, or may be learned by the practice of the invention as set forth hereinafter.

The scope of the present invention is to be determined by the claims. Accordingly, any features, characteristics, advantages, or the like, discussed below in the discussion of embodiments of this specification shall not be taken to mean that such features, characteristics, advantages, or the like are required to practice the present invention as defined by the claims.

Embodiments of the present invention are described with reference to the Figures. It should be noted that although the example embodiments are illustrated as a solar farm, the embodiments are applicable to any number of solar panel, mirror and SEG combinations.

Figure 2:
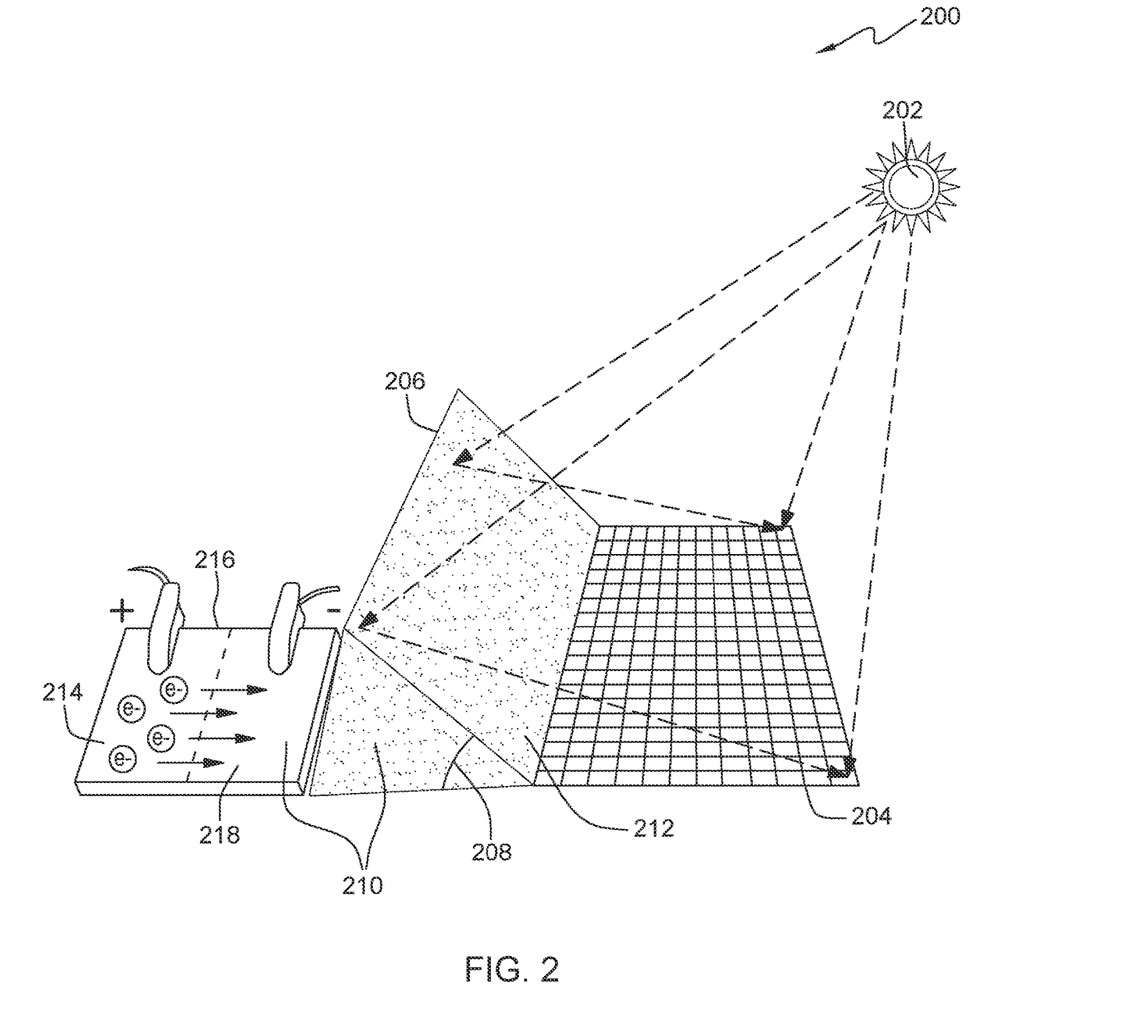
FIG. 2 depicts an inclined mirror between a solar panel and a SEG, in accordance with at least one embodiment of the present invention.

Looking to FIG. 2 is a diagram 200 depicting an embodiment of a solar panel 204 mounted adjacent to an inclined mirror 206 wherein the incline is appropriate for the latitude of the location where the solar panel 204 is installed and the position of the sun 202. In one aspect of an embodiment of the present invention, based on the incline, the mirror 206 forms an angle 208 with the plane of the solar panel 204 creating a shadow profile 210 adjacent to the solar panel 204 and reflecting additional solar energy 212 onto the solar panel 204.

In another aspect of an embodiment of the present invention, the shadow profile 210 can extend across a portion of a SEG 216, creating an unshaded portion 214 of the SEG 216 and a shaded portion 218 of the SEG 216. It should be noted that a SEG 216 is a device which can generate power based on a contrast between a portion of the SEG 216 being illuminated with solar radiation and a portion of the SEG 216 being shaded from solar radiation. It should further be noted that an optimum angle 208 of the mirror 206 can be determined based on factors such as, but not limited to, the current irradiance profile, an irradiance forecast profile, mirror 206 specifications, shadow profile 210 and characteristics of an SEG 216.

Considering one aspect of an embodiment of the present invention, a SEG 216 can leverage the contrast between sunlight irradiation and shadow to create an electric current, allowing harvesting of additional energy from a solar energy farm without increasing the area required by the solar panel 204 installation. It should be noted that adding SEG 216 to a solar energy farm can increase energy production by approximately fifteen percent for a five percent increase in cost.

In another aspect of an embodiment of the present invention, sensitivity profiles of SEGs 216 can be obtained. In one example, a sensitivity profile of a shadow contrast ratio, relative position of shadow profile and associated power generation profiles are generally published by SEG 216 manufacturers based on the SEG 216 design and associated embedded thin film thickness characteristics, e.g., gold, tungsten, copper, Aluminum, etc. It should be noted that a three-dimensional lookup table can be generated as a knowledge base for each type of SEG 216.

Figure 3:
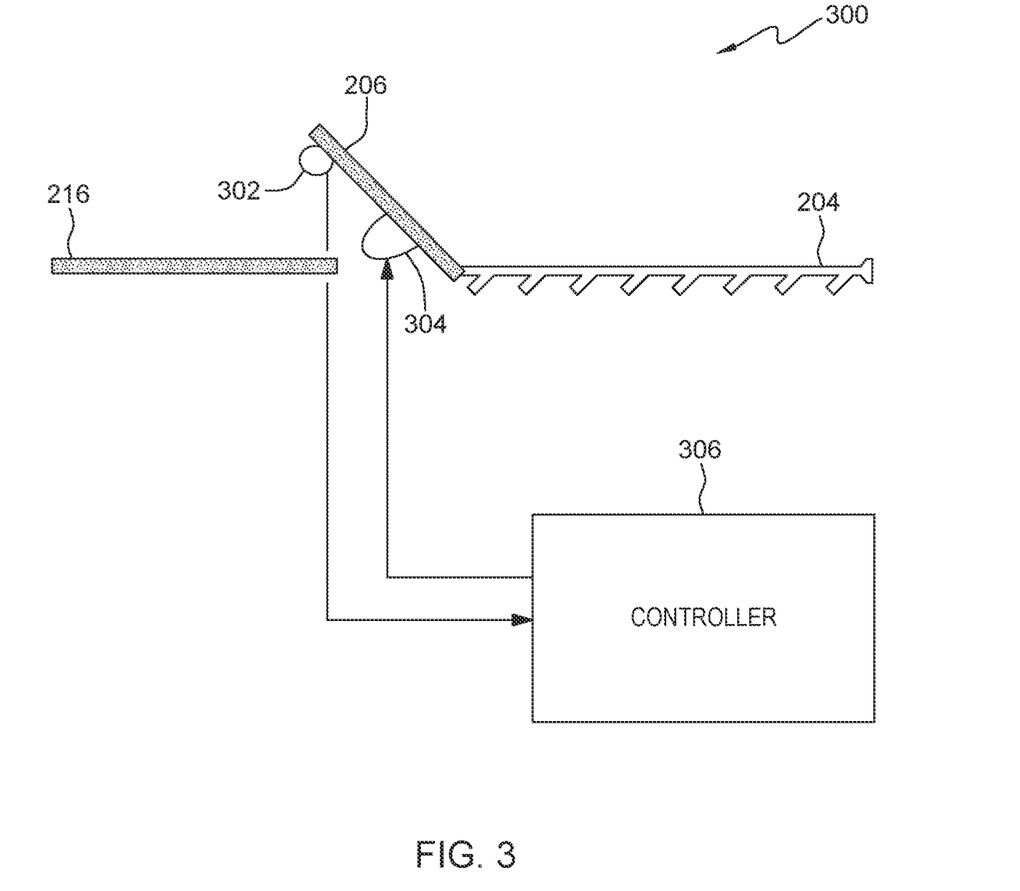
FIG. 3 depicts an inclined mirror between a solar panel and a SEG with an inclinometer and an actuator attached to the mirror and communicatively connected to a controller, in accordance with at least one embodiment of the present invention.

Turning now to FIG. 3 and diagram 300, another embodiment of a solar panel 204 mounted adjacent to an inclined mirror 206 wherein the incline is appropriate for the latitude of the location where the solar panel 204 is installed, producing a shadow profile across a portion of a SEG 216. Diagram 300 further comprises an inclinometer 302 and an actuator 304, both attached to the mirror 206. The inclinometer 302 and the actuator 304 are communicatively connected to a controller 306 capable of at least receiving input from the inclinometer and sending output to the actuator to adjust the inclination of the mirror 206. It should be noted that the controller 306 can be powered at least from a portion of the power provided by the solar panel 204.

In another aspect of an embodiment of the present invention, control of mirror 206 inclination can be adjusted based on optimizing input control parameters based on data such as, but not limited to geolocation, terrain topography, irradiance satellite observations, local weather forecast, time of day, solar panel area, and mirror area. In another aspect of an embodiment of the present invention, a spatial temporal learning model can be employed to predict solar irradiance, shadow contrast ratio and shadow relative position as input to controller 306 to perform shadow and illumination angle control. It should be noted that the optimization is based on an employed SEG 216 thin film type, e.g., gold, aluminum, tungsten, copper, etc. and a power profile and its sensitivity knowledge base.

Figure 4:
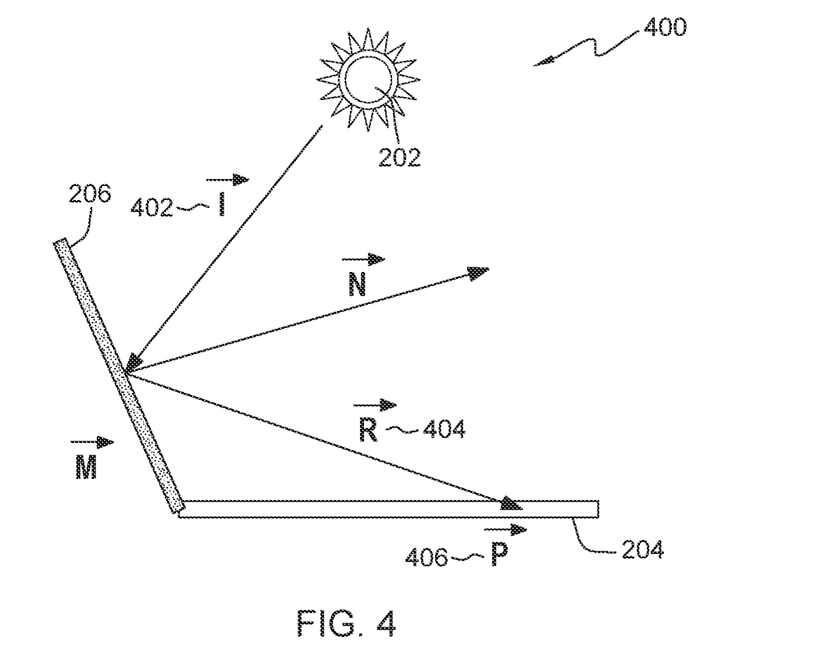
FIG. 4 depicts an exemplary detailed architecture of an irradiance profile, in accordance with at least one embodiment of the present invention.

Looking now to FIG. 4 and an architecture 400 comprising another aspect of an embodiment of the present invention, a mirror-reflected irradiation profile 406 can be obtained by determining points where the solar energy, represented by vector I 402, striking a mirror 206 is reflected, represented by vector R 404, subsequently striking a solar panel 204. In another aspect of an embodiment of the present invention, equations $\hat{R}=\hat{I}-2(\hat{I}\cdot\hat{N})\hat{N}$ and $\vec{P}=\vec{M}+\lambda_1\hat{R}$ wherein $\lambda_1$ is determined based on the relationship $(\vec{M}+\lambda_1\hat{R})_{z=0}$ and where $\hat{N}$ is the normal vector perpendicular to the surface of the mirror 206.

Figure 5:
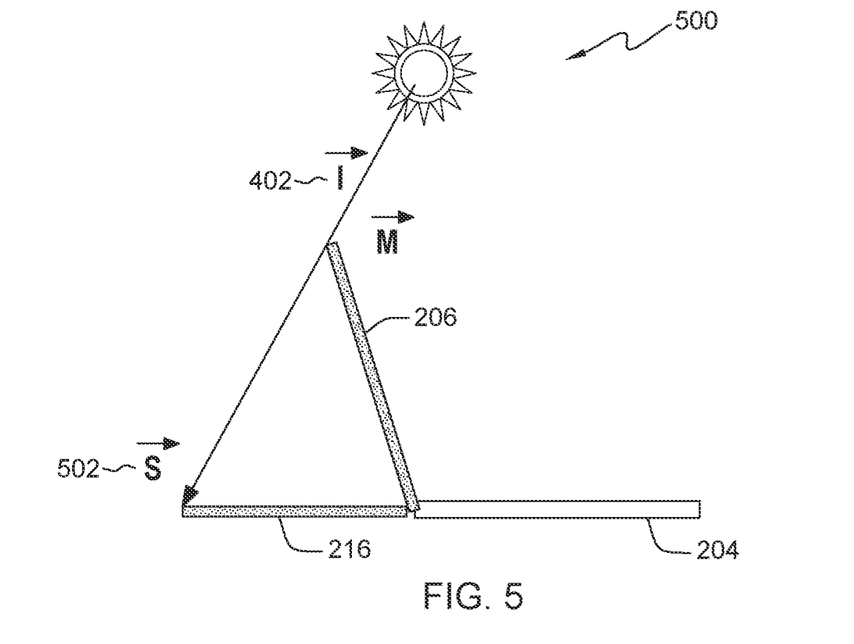
FIG. 5 depicts an exemplary detailed architecture of a shadow profile, in accordance with at least one embodiment of the present invention.

Turning now to FIG. 5 and an architecture 500 comprising another aspect of an embodiment of the present invention, a mirror-created shadow profile 502 can be obtained by extending the incident vector I 402 and determining where the incident vector I 402 strikes the SEG 216. In another aspect of an embodiment of the present invention, equation $\vec{S}=\vec{M}+\lambda_2\hat{I}$ wherein $\lambda_2$ is determined based on the relationship $(\vec{M}+\lambda_2\hat{I})_{z=0}$.

Figure 6:
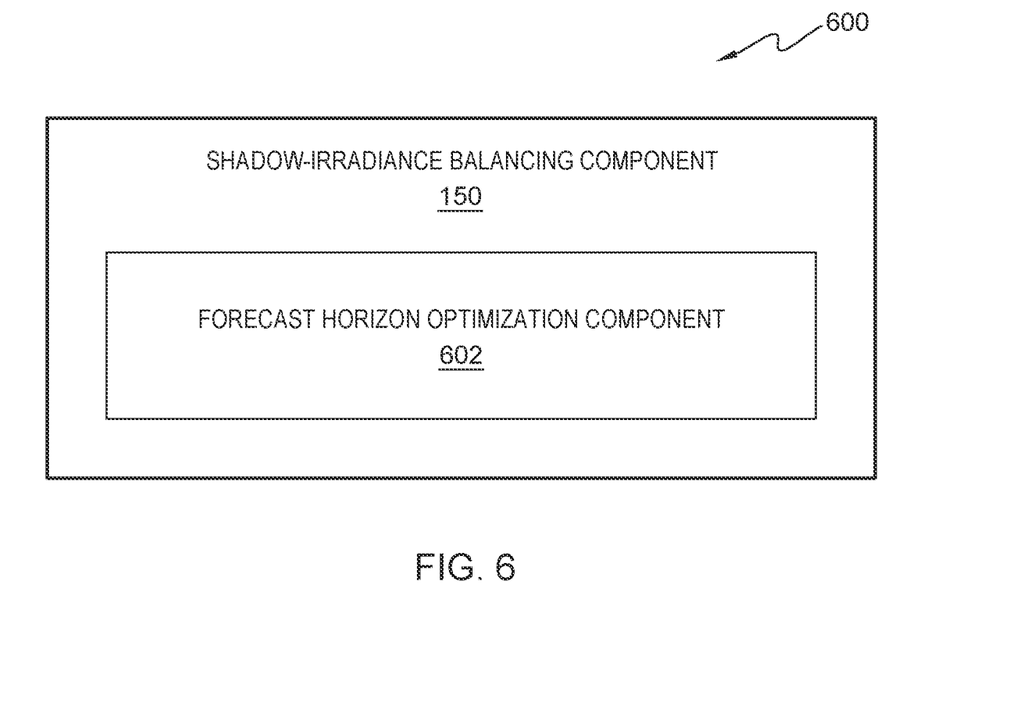
FIG. 6 depicts an exemplary detailed architecture of a shadow-irradiance balancing component comprising a forecast horizon optimization component, in accordance with at least one embodiment of the present invention.

FIG. 6 is an exemplary detailed architecture for performing various operations of FIG. 1, in accordance with various embodiments. The architecture 600 may be implemented in accordance with the present invention in any of the environments depicted in FIGS. 1-5 and 7, among others, in various embodiments. Of course, more or less elements than those specifically described in FIG. 6 may be included in architecture 600, as would be understood by one of skill in the art upon reading the present descriptions.

Architecture 600 provides a detailed view of at least some of the modules of diagram 100. Architecture 600 can comprise a shadow-irradiance balancing component 150, which can further comprise forecast horizon optimization component 602.

Looking now to FIG. 6 and another aspect of an embodiment of the present invention, shadow-irradiance balancing component 150 can include, but is not limited to an algorithm that can calculate a cost function over the receding horizon based on controlling mirror reflector inclination subject to small step changes considering the entire prediction horizon. For example, at each small step, an angle can be chosen such that it is the optimal angle for the next "N" steps, based on changes in solar irradiance and SEG shadow profile as illustrated in the algorithm:

$$J = \sum_{i=1}^{N} w_{L_i}(L_i^r - L_i^m(\alpha))^2 + \sum_{i=1}^{N} w_{CR_i}(CR_i^r - CR_i^m(\alpha))^2 + \sum_{i=1}^{N} w_{CR_i}(R_i^r - R_i^m(\alpha))^2 + \sum_{i=1}^{N} w_{u(\alpha)_i}(\Delta u)^2$$

wherein J is the cost function over the receding horizon; $L_i^r$ is the optimal irradiance for the instant "i;" $L_i^m$, is the measured irradiance for the instant "i;" $CR_i^r$ is the optimal shadow contrast ratio for the instant "I" from the knowledge base; $CR_i^m$ is the chosen shadow contrast for the instant "i;" $R_i^r$ is the optimal relative shadow position for the instant "I" from the knowledge base; $R_i^m$ is the captured relative shadow position for the instant "i," which is a function of the horizontal and lateral position of the SEG; u is the respective mirror controller variable; $w_{CR_i}$ is the weighting coefficient for the instant shadow contrast ratio; $w_{L_i}$ is the weighting coefficient for the instant irradiance; $w_{u(\alpha)_i}$ is the penalizing coefficient for large changes in the instant mirror angle controller inclination; and $\alpha$ is the mirror angle, respectively. It should be noted that the receding horizon cost function is subject to the constraints defined as $0 \leq L_i^m \leq L^{max}$, $0 \leq CR_i^m \leq CR^{max}$ and $0 \leq R_i^m \leq R^{max}$ for selected shadow profile and irradiance profile.

In one aspect of an embodiment of the present invention, a combination of sun position, forecasted irradiance profile, mirror reflected profile and predicted shadow profile, i.e., contrast ratio and relative position, along with the characteristics of a SEG can optimally find the angle of reflective mirror with respect to a solar panel, to maximize the aggregated power generation. In another aspect of an embodiment of the present invention, determining an optimal mirror angle can maximize the aggregated power generation by optimizing the shadow profile created by the mirror wherein the determined optimal mirror angle is optimal for the forecasted time horizon by considering the SEG characteristics and the controller constraints.

Figure 7:
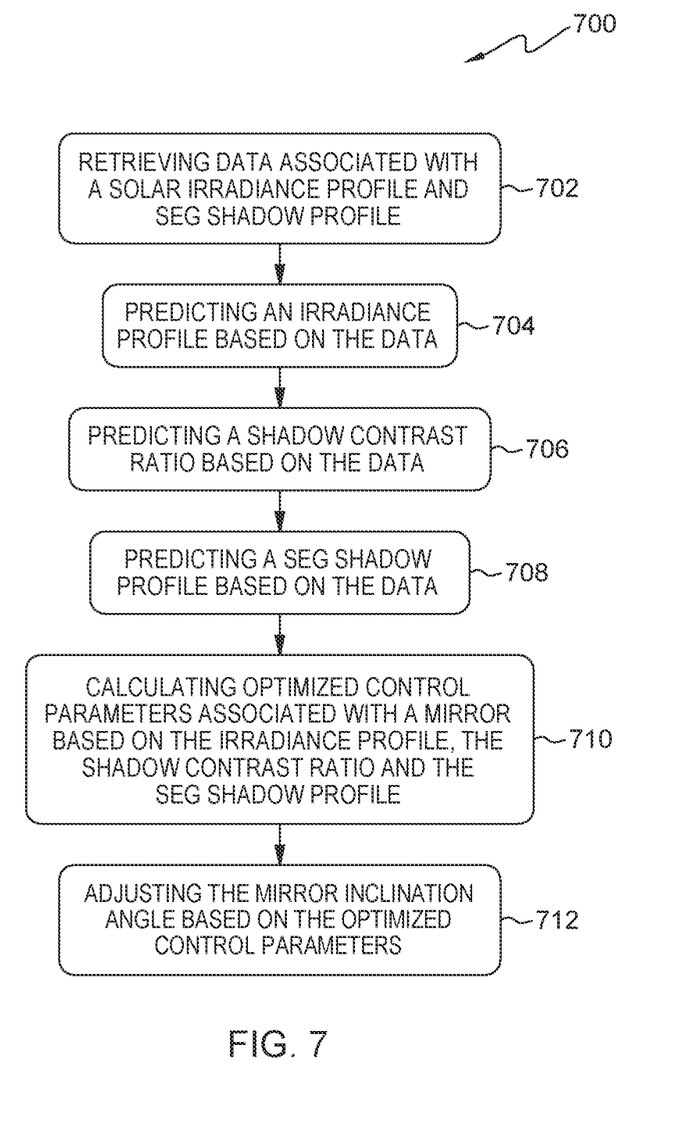
FIG. 7 is a flowchart of a method for adjusting the inclination of a mirror to maximize power output, in accordance with at least one embodiment of the present invention.

FIG. 7 is an exemplary flowchart of a method 700 for adjusting an inclination angle of a mirror to maximize power output of an adjacent solar panel and shadow-effect energy generator (SEG). At step 702, an embodiment can retrieve data associated with a solar irradiance profile and a SEG shadow profile. At step 704, the embodiment can predict an irradiance profile based on the data. At step 706, the embodiment can predict a shadow contrast ratio based on the data. At step 708, the embodiment can predict a SEG shadow profile based on the data. At step 710, the embodiment can calculate optimized control parameters associated with a mirror based on the irradiance profile, the shadow contrast ratio and the SEG shadow profile. At step 712, the embodiment can adjust the mirror inclination angle based on the optimized control parameters.

What is claimed is:

1. A computer-implemented method comprising:
    retrieving, by one or more processors, data associated with a solar irradiance profile and a shadow-effect energy generator (SEG) shadow profile;
    predicting, by the one or more processors, an irradiance profile based on the data;
    predicting, by the one or more processors, a shadow contrast ratio based on the data;
    predicting, by the one or more processors, a SEG shadow profile based on the data;
    calculating, by the one or more processors, optimized control parameters associated with a mirror based on the irradiance profile, the shadow contrast ratio and the SEG shadow profile; and
    adjusting, by the one or more processors, an inclination angle of the mirror based on the control parameters.

2. The computer-implemented method of claim 1, wherein the predicting the irradiance profile, the predicting the shadow contrast ratio, and the predicting the SEG shadow profile employ a spatial temporal learning model.

3. The computer-implemented method of claim 1, wherein the data comprises a selection from the group consisting of: geolocation data, terrain topography data, irradiance satellite observation data, time of day data, and solar panel area data.

4. The computer-implemented method of claim 1, wherein the calculating is based on an equation:

$$J = \sum_{i=1}^{N} w_{L_i}(L_i^r - L_i^m(\alpha))^2 + \sum_{i=1}^{N} w_{CR_i}(CR_i^r - CR_i^m(\alpha))^2 + \sum_{i=1}^{N} w_{CR_i}(R_i^r - R_i^m(\alpha))^2 + \sum_{i=1}^{N} w_{u(\alpha)_i}(\Delta u)^2,$$

wherein J is a cost function over a receding horizon; $L_i^r$ is an optimal irradiance for an instant "i;" $L_i^m$, is a measured irradiance for the instant "i;" $CR_i^r$ is an optimal shadow contrast ratio for the instant "i" from a knowledge base; $CR_i^m$ is a chosen shadow contrast for the instant "i;" $R_i^r$ is an optimal relative shadow position for the instant "i" from the knowledge base; $R_i^m$ is a captured relative shadow position for the instant "i," which is a function of a horizontal and lateral position of the SEG; u is a respective mirror controller variable; $w_{CR_i}$ is a weighting coefficient for the instant shadow contrast ratio; $w_{L_i}$ is a weighting coefficient for the instant irradiance; $w_{u(\alpha)_i}$ is a penalizing coefficient for large changes in an instant mirror angle controller inclination; and $\alpha$ is a mirror angle, respectively; and the receding horizon cost function is subject to constraints defined as $0 \leq L_i^m \leq L^{max}$, $0 \leq CR_i^m \leq CR^{max}$ and $0 \leq R_i^m \leq R^{max}$ for selected shadow profile and irradiance profile.

5. The computer-implemented method of claim 1, wherein the calculating is performed on a predetermined time interval.

6. The computer-implemented method of claim 1, wherein the adjusting the inclination angle of the mirror is constrained to a predetermined maximum change in angle.

7. The computer-implemented method of claim 1, wherein the adjusting the inclination angle of the mirror is based on an optimal angle for maximizing power output of a predetermined number of adjacent solar panels.

8. The computer-implemented method of claim 1, wherein the irradiance profile entirely illuminates an adjacent solar panel.

9. The computer-implemented method of claim 1, wherein the predicting an irradiance profile is based on a weather forecast for a latitude and longitude associated with a location of the mirror.

10. A computer system comprising:
a solar panel;
a mounting system for the solar panel;
a mirror positioned adjacent to the solar panel;
an inclinometer and an actuator operable to change an inclination angle of the mirror;
a shadow-effect energy generator (SEG) positioned adjacent to the solar panel;
a processor set;
one or more computer readable storage media; and
program instructions stored on the one or more computer readable storage media to cause the processor set to perform operations comprising:
retrieving data associated with a solar irradiance profile and a SEG shadow profile;
predicting an irradiance profile based on the data;
predicting a shadow contrast ratio based on the data;
predicting a SEG shadow profile based on the data;
calculating control parameters associated with the mirror based on the irradiance profile, the shadow contrast ratio, and the SEG shadow profile; and
adjusting an inclination angle of the mirror based on the control parameters.

11. The computer system of claim 10, wherein the predicting the irradiance profile, the predicting the shadow contrast ratio, and the predicting the SEG shadow profile employ a spatial temporal learning model.

12. The computer system of claim 10, wherein the data comprises a selection from the group consisting of: geolocation data, terrain topography data, irradiance satellite observation data, time of day data, and solar panel area data.

13. The computer system of claim 10, wherein the calculating is based on an equation:

$$J = \sum_{i=1}^{N} w_{L_i}(L_i^r - L_i^m(\alpha))^2 + \sum_{i=1}^{N} w_{CR_i}(CR_i^r - CR_i^m(\alpha))^2 + \sum_{i=1}^{N} w_{CR_i}\left(R_i^r - R_i^m(\alpha)\right)^2 + \sum_{i=1}^{N} w_{u(\alpha)_i}(\Delta u)^2,$$

wherein J is a cost function over a receding horizon; $L_i^r$ is an optimal irradiance for an instant "i;" $L_i^m$, is a measured irradiance for the instant "i;" $CR_i^r$ is an optimal shadow contrast ratio for the instant "i" from a knowledge base; $CR_i^m$ is a chosen shadow contrast for the instant "i;" $R_i^r$ is an optimal relative shadow position for the instant "i" from the knowledge base; $R_i^m$ is a captured relative shadow position for the instant "i," which is a function of a horizontal and lateral position of the SEG; u is a respective mirror controller variable; $w_{CR_i}$ is a weighting coefficient for the instant shadow contrast ratio; $w_{L_i}$ is a weighting coefficient for the instant irradiance; $w_{u(\alpha)_i}$ is a penalizing coefficient for large changes in an instant mirror angle controller inclination; and $\alpha$ is a mirror angle, respectively; and the receding horizon cost function is subject to constraints defined as $0 \leq L_i^m \leq L^{max}$, $0 \leq CR_i^m \leq CR^{max}$ and $0 \leq R_i^m \leq R^{max}$ for selected shadow profile and irradiance profile.

14. The computer system of claim 10, wherein the calculate are calculating is performed on a predetermined time interval.

15. The computer system of claim 10, wherein the adjusting the inclination angle of the mirror is constrained to a predetermined maximum change in angle.

16. The computer system of claim 10, wherein the adjusting the inclination angle of the mirror is based on an optimal angle for maximizing power output of a predetermined number of adjacent solar panels.

17. The computer system of claim 10, wherein the irradiance profile entirely illuminates an adjacent solar panel.

18. The computer system of claim 10, wherein the predicting an irradiance profile is based on a weather forecast for a latitude and longitude associated with a location of the mirror.

19. A computer program product comprising:
one or more computer readable storage media; and
program instructions stored on the one or more computer readable storage media to perform operations comprising:
retrieving data associated with a solar irradiance profile and an shadow-effect energy generator (SEG) shadow profile;
predicting an irradiance profile based on the data;
predicting a shadow contrast ratio based on the data;
predicting a SEG shadow profile based on the data;
calculating control parameters associated with a mirror based on the irradiance profile, the shadow contrast ratio and the SEG shadow profile; and
adjusting an inclination angle of the mirror based on the control parameters.

20. The computer program product of claim 19, wherein the calculating is based on an equation:

$$J = \sum_{i=1}^{N} w_{L_i}(L_i^r - L_i^m(\alpha))^2 + \sum_{i=1}^{N} w_{CR_i}(CR_i^r - CR_i^m(\alpha))^2 + \sum_{i=1}^{N} w_{CR_i}(R_i^r - R_i^m(\alpha))^2 + \sum_{i=1}^{N} w_{u(\alpha)_i}(\Delta u)^2,$$

wherein J is a cost function over a receding horizon; $L_i^r$ is an optimal irradiance for an instant "i;" $L_i^m$, is a measured irradiance for the instant "i;" $CR_i^r$ is an optimal shadow contrast ratio for the instant "i" from a knowledge base; $CR_i^m$ is a chosen shadow contrast for the instant "i;" $R_i^r$ is an optimal relative shadow position for the instant "i" from the knowledge base; $R_i^m$ is a captured relative shadow position for the instant "i," which is a function of a horizontal and lateral position of the SEG; u is a respective mirror controller variable; $w_{CR_i}$ is a weighting coefficient for the instant shadow contrast ratio; $w_{L_i}$ is a weighting coefficient for the instant irradiance; $w_{u(\alpha)_i}$ is a penalizing coefficient for large changes in an instant mirror angle controller inclination; and $\alpha$ is a mirror angle, respectively; and the receding horizon cost function is subject to constraints defined as $0 \leq L_i^m \leq L^{max}$, $0 \leq CR_i^m \leq CR^{max}$ and $0 \leq R_i^m \leq R^{max}$ for selected shadow profile and irradiance profile.

\* \* \* \* \*